(12) United States Patent
Magzimof et al.

(10) Patent No.: US 11,794,755 B2
(45) Date of Patent: Oct. 24, 2023

(54) VEHICLE TELEOPERATOR RANKING AND SELECTION

(71) Applicant: Phantom Auto Inc., Mountain View, CA (US)

(72) Inventors: Shay Magzimof, Palo Alto, CA (US); David Parunakian, Moscow (RU); Michael Kris, Campbell, CA (US)

(73) Assignee: Phantom Auto Inc., South San Francisco, CA (US)

( * ) Notice: Subject to any disclaimer, the term of this patent is extended or adjusted under 35 U.S.C. 154(b) by 63 days.

(21) Appl. No.: 17/525,831

(22) Filed: Nov. 12, 2021

(65) Prior Publication Data

US 2022/0073083 A1 Mar. 10, 2022

Related U.S. Application Data

(63) Continuation of application No. 16/544,779, filed on Aug. 19, 2019, now Pat. No. 11,214,265.

(60) Provisional application No. 62/721,418, filed on Aug. 22, 2018.

(51) Int. Cl.
*B60W 40/09* (2012.01)
*G05D 1/00* (2006.01)
*G07C 5/00* (2006.01)

(52) U.S. Cl.
CPC .......... *B60W 40/09* (2013.01); *G05D 1/0038* (2013.01); *G07C 5/008* (2013.01); *B60W 2540/30* (2013.01); *G05D 2201/0213* (2013.01)

(58) Field of Classification Search
CPC ............ B60W 40/09; B60W 2540/30; B60W 2556/45; B60W 50/082; B60W 60/005; G05D 1/0038; G05D 2201/0213; G05D 1/0027; G07C 5/008; G06Q 10/063112
USPC .......................................................... 701/1
See application file for complete search history.

(56) References Cited

U.S. PATENT DOCUMENTS

| | | |
|---|---|---|
| 10,395,444 B1 | 8/2019 | Edren et al. |
| 2015/0248131 A1 | 9/2015 | Fairfield et al. |
| 2016/0358475 A1 | 12/2016 | Prokhorov |
| 2018/0136651 A1 | 5/2018 | Levinson et al. |
| 2018/0196415 A1 | 7/2018 | Iagnemma et al. |
| 2018/0196416 A1 | 7/2018 | Iagnemma et al. |
| 2018/0365908 A1* | 12/2018 | Liu .................. G06N 5/003 |
| 2019/0011910 A1* | 1/2019 | Lockwood ........ G05D 1/0038 |
| 2019/0011912 A1 | 1/2019 | Lockwood et al. |
| 2019/0250626 A1 | 8/2019 | Ghafarianzadeh et al. |
| 2019/0258246 A1 | 8/2019 | Liu et al. |
| 2020/0057436 A1* | 2/2020 | Boda ................. H04Q 9/00 |

* cited by examiner

FOREIGN PATENT DOCUMENTS

| | | | |
|---|---|---|---|
| WO | WO 2018/087879 A1 | | 5/2018 |
| WO | WO-2018087879 | * | 5/2018 |

OTHER PUBLICATIONS

United States Office Action, U.S. Appl. No. 16/544,779, dated May 26, 2021, 16 pages.

*Primary Examiner* — Muhammad Shafi
(74) *Attorney, Agent, or Firm* — Fenwick & West LLP

(57) ABSTRACT

A system provides on-demand remote support services including teleoperation of vehicles. In response to a remote support request, the system assesses environmental conditions, historical data, and/or parameters of a request for remote support to rank available operators capable of fulfilling the request, and selects an optimal operator for the remote support request based on desired criteria.

20 Claims, 8 Drawing Sheets

VEHICLE TELEOPERATOR RANKING AND SELECTION

CROSS-REFERENCE TO RELATED APPLICATIONS

This application is a continuation of U.S. patent application Ser. No. 16/544,779 filed on Aug. 19, 2019, which claims the benefit of U.S. Provisional Patent Application No. 62/721,418, filed on Aug. 22, 2018, the contents of which are each incorporated by reference herein.

BACKGROUND

Technical Field

The disclosed embodiments relate generally to remotely controlled vehicles, and more specifically, to a system for profiling and ranking remotely controlled vehicle operators, and a system for matching an available operator to a vehicle requesting remote support.

Description of the Related Art

The ongoing reinvention of automotive transport and road infrastructure as an intelligent complex has brought about a proliferation of onboard telemetry acquisition systems and autonomous driving solutions based on machine learning methods. This trend is also expected to significantly benefit from the advances in wireless communication technology, as performance provided by the prospective 5G cellular technology allows intelligent transport system (ITS) developers to utilize a wide spectrum of networked solutions demanding high bandwidth and low latency conditions.

This nascent field of research has already produced vehicles possessing a certain degree of autonomy; however, the general problem of a complete replacement of a human driver by a software system is unlikely to be solved in the observable future. While autonomous vehicle (AV) technology can already provide certain benefits and reduce costs for industries such as taxi and long haul cargo delivery, at this time these benefits cannot be enjoyed since no existing AV products can provide full autonomy over the whole route with the required degree of reliability. A possible solution to this problem would be to use a human driver as a backup solution for route segments and situations which the AV technology is incapable of navigating safely. However, since keeping a driver onboard an autonomous vehicle at all times would defeat the entire purpose of developing the AV technology, it is desirable to build a teleoperation system providing an on-demand remote human driver service. Additionally, a cloud-based artificial intelligence agent may possess capabilities and resources allowing it to successfully navigate a vehicle where a local artificial intelligence agent available onboard fails, while interacting with the vehicle and other components of the teleoperation system via the same interface as remote human drivers.

In order to build such a teleoperation system, the problem of optimal teleoperator selection should be solved, among other challenges. Evidently, drivers and remote operators may possess varying skills and expertise levels. It is therefore desirable to accurately predict the specific quality of service that may be expected from each remote operator and to optimize the teleoperation system based on these predictions.

SUMMARY OF THE EMBODIMENTS

A remote support system selects a teleoperator to remotely operate a vehicle in response to a remote support request. The remote support request is received from the vehicle. Based on the remote support request, a class of the vehicle associated with the request is identified. Based on the class of the vehicle, respective operator scores associated with the class of the vehicle are identified for a plurality of candidate operators. The vehicle is matched to a chosen operator from among the plurality of candidate operators based at least in part on the respective operator scores. The chosen operator is assigned to service the remote support request.

In an embodiment, a teleoperator scoring database is established for tracking operator scores that may be utilized in the ranking and assignment of operators for a remote support request. A test driving session of an operator is initiated at a remote support terminal for a vehicle belonging to a vehicle class. An instruction is issued to the operator to instruct the operator to perform a driving maneuver via controls of the remote support terminal. Data is collected relating to the driving maneuver. An operator score is computed for the operator based on the data. The operator score is stored in association with the operator and the vehicle class to the teleoperator scoring database.

In an embodiment, the above-described methods may be performed by a server including one or more processors and a non-transitory computer-readable storage medium that stores instructions executable by the one or more processors to carry out the methods described herein.

DETAILED DESCRIPTION

A system providing on-demand remote support services to vehicles assesses the environment and specifics of a remote support request, ranks the available operators capable of fulfilling the request for the remote support session, and selects an optimal operator for the remote support request based on desired criteria.

Figure 1:
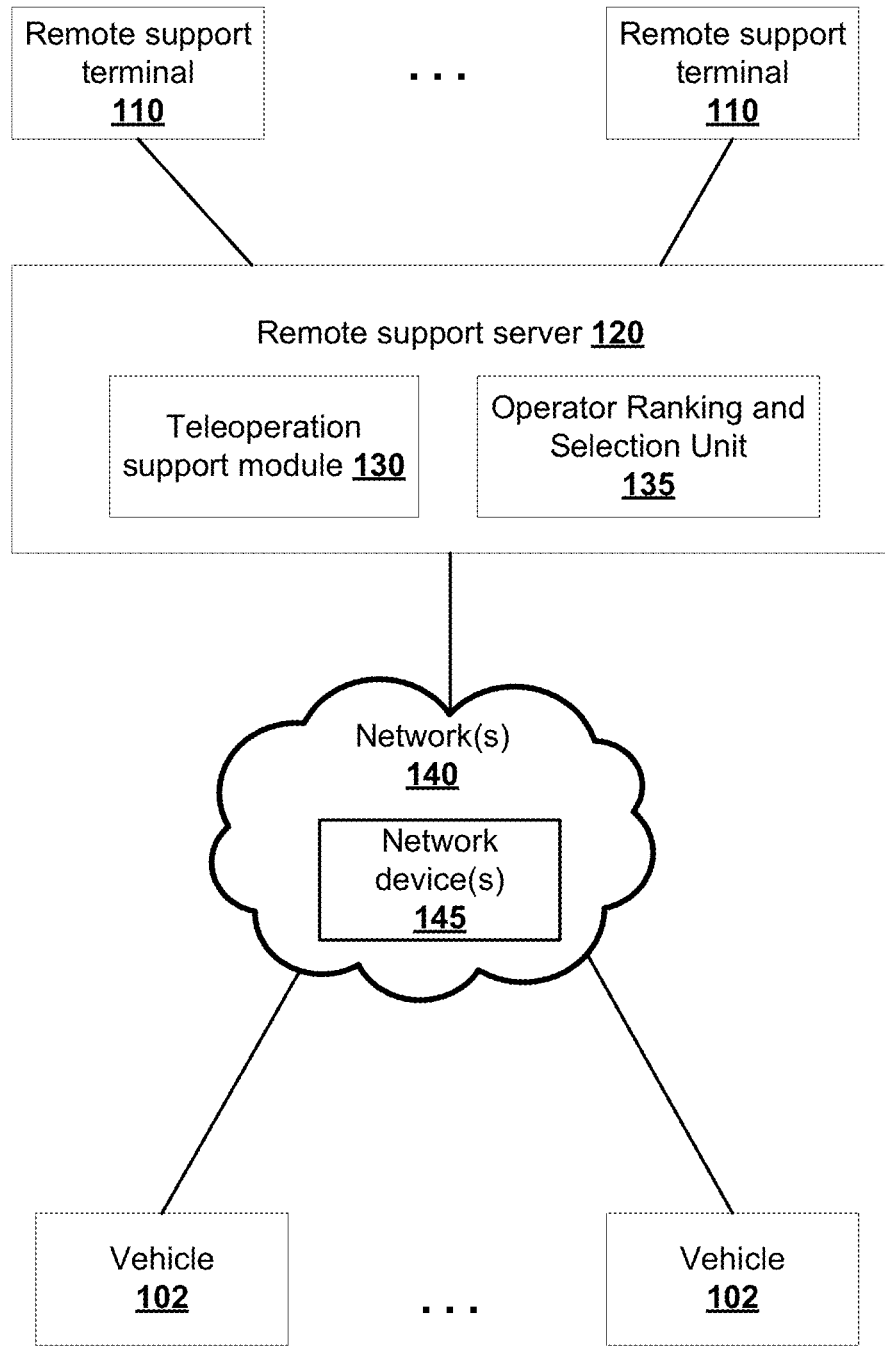
FIG. 1 is a block diagram illustrating an example embodiment of a vehicle environment.

FIG. 1 is a block diagram of a vehicle environment 100 including a plurality of vehicles 102, a remote support server 120 supporting one or more remote support terminals 110, and one or more networks 140 comprising network devices 145. In alternative embodiments, the vehicle environment 100 may include different or additional components.

The vehicle 102 comprises a land vehicle (e.g. a car or truck), a seaborne vehicle, a subterranean vehicle, an airborne vehicle, or other vehicle. The vehicle 102 may comprise an intelligent transport system (ITS) that connects to one or more networks 140 and communicates with one or more entities via the one or more networks 140 (e.g., the remote support server 120 and/or other vehicles 102) to enable the vehicle 102 to obtain information useful to safe navigation of an environment. In an embodiment, the vehicle 102 may comprise an autonomous or semi-autonomous vehicle that includes an autonomous driving system that automatically controls navigation based on sensed environment conditions. Alternatively, the vehicle 102 may comprise a non-autonomous vehicle that relies on control inputs from a driver in the vehicle 102 or from the remote support server 120. In the case of teleoperation, the vehicle 102 wirelessly receives control inputs via the one or more networks 140 that control various components of the drive system such as the steering system, acceleration, braking, etc. The vehicle 102 may also comprise various sensors such as optical or infrared cameras, ranging devices such as LIDAR, sonar or radar units, other sensor types allowing real-time acquisition of data on the vehicle environment 100, vehicle 102 components and occupants, that capture image data and other environmental data that may be streamed over one or more networks 140 to a remote support server 120 or to other vehicles 102.

The vehicle 102 may depend on a reliable network connection for streaming video or other sensor data to the remote support server 120 and for receiving control inputs or data used by the vehicle 102 to navigate in a safe and efficient manner. For example, to provide teleoperation support to a vehicle 102, it is important that the video stream is received at the remote support server 120 in real-time with a latency as low as possible. Therefore, the vehicle 102 may switch between different networks 140, may switch between different connections to different network devices 145 of the networks 140, and/or may maintain multiple simultaneous connections to optimize its connectivity.

The remote support server 120 includes a teleoperation support module 130 and an operator ranking and selection (ORSU) unit 135. In alternative embodiments, the remote support server 120 may include additional or different components. Furthermore, in alternative embodiments, all or some of the functions attributed to the teleoperator support module 130 and ORSU 135 may be performed on different servers that are not necessarily co-located. For example, certain functions may be performed on computing nodes of roadside infrastructure units or on one or more vehicles 102. The teleoperation support module 130 and ORSU 135 may each be implemented as one or more non-transitory computer-readable storage mediums that stores instructions executed by one or more processors to perform the functions attributed herein.

In an embodiment, the teleoperation support module 130 communicates with a vehicle 102 to provide teleoperation or other support services in instances when extra assistance is desired. For example, the vehicle 102 may request teleoperation assistance from the teleoperation support module 130 when one or more vehicle sensors fail, when an unknown problem occurs with the vehicle's autonomous driving software, when the vehicle 102 encounters a barrier or other hazardous road conditions, or when a passenger manually requests remote assistance. Furthermore, the teleoperation support module 130 may provide teleoperation support when the vehicle 102 enters a geographic region where it is not legally permitted to operate in a completely autonomous way.

In an embodiment, upon requesting remote support, a video stream capturing the vehicle environment may be provided by the vehicle 102 to the teleoperation support module 130 and presented at a remote support terminal 110. A human teleoperator at the remote support terminal 110 may view the video stream on a display to assess the situation and take appropriate action via a control input device at the remote support terminal 110. In this embodiment, the teleoperation support module 130 may present real-time video streamed from the vehicle 102 to a display of the remote support terminal 110 and may provide real-time control data to the vehicle 102 received via the remote support terminal 110 to enable the teleoperator remotely drive the vehicle 102.

In another embodiment, the teleoperation support module 130 may comprise an artificial intelligence agent that does not necessarily require a remote support terminal 110 with a display or physical controls for providing human input. Here, the teleoperation support module 130 may provide control instructions to the vehicle 102 directly based on the processing of a real-time video feed and other sensor data streamed to the teleoperation support module 130 from the vehicle 102 without necessarily utilizing any human input. In alternative embodiments, the teleoperation support module 130 may comprise a semi-robotic agent that interacts with a remote support terminal 110 in a similar manner as a human teleoperator.

The remote support terminals 110, if present, may be coupled to the remote support server 120 via a local area network connection, a direct wired connection, or via a remote connection through the network 140. A remote support terminal 110 may include a display to enable a human teleoperator to view real-time video of the vehicle environment and controls for enabling a human teleoperator to control the vehicle. In an embodiment, the video may include at least a front view that mimics or approximates the view seen by a driver within the vehicle 102. Optionally, the video may include additional views, such as a rear view video, side view videos, or other views that may mimic the views seen by a driver in mirrors of a traditional vehicle or may include other views not necessarily available to a driver of a traditional vehicle. The controls may include controls that mimic those available within a traditional vehicle such as a steering wheel, acceleration pedal, and brake pedal. Alternatively, different forms of controls may be available at the remote terminal 110 such as a joystick, mouse, touch screen, voice control system, gesture control system, or other input mechanism to control one or more aspects of the vehicle 102.

In other embodiments, where the teleoperation support module 130 operates entirely as an artificial intelligence agent without human intervention, the remote support terminals 110 may be omitted.

The ORSU 135 facilitates assignment of a particular teleoperator to a particular vehicle 102 in response to a remote support request. For example, the ORSU 135 may learn characteristics of different operators in order to assess their abilities to handle a particular request. Upon receiving a request, the ORSU 135 facilitates assignment of an operator to the request based on the availability of operators and the learn characteristics of the operators. Optionally, the ORSU 135 may furthermore consider other factors such as a cost associated with an operator or a selection request from a vehicle 102.

In an embodiment, the ORSU 135 facilitates a synthetic test or a plurality thereof to evaluate the skill level of a plurality of operators. Responsive to the data acquired during the tests, a metric is derived to describe the operators. In another embodiment, the ORSU 135 uses sensor data obtained from a sensor array of a vehicle 101 during a plurality of remote support sessions in conjunction with auxiliary information such as customer feedback or custom business-specific metrics to evaluate the skill level of a plurality of operators fulfilling the remote support sessions. Responsive to the data and the auxiliary information, a metric is derived to describe the operators. In yet another embodiment, the ORSU 135 facilitates simulated remote support sessions that are fulfilled by a plurality of operators in a virtual environment. Responsive to the data acquired during the simulated sessions, a metric is derived to describe the operators.

In an embodiment, the ORSU 135 facilitates a synthetic test or a plurality thereof to evaluate the skill level of a plurality of operators. Responsive to the data acquired during the tests, a metric is derived to describe the operators. In another embodiment, the ORSU 135 uses sensor data obtained from a sensor array of a vehicle 101 during a plurality of remote support sessions in conjunction with auxiliary information such as customer feedback or custom business-specific metrics to evaluate the skill level of a plurality of operators fulfilling the remote support sessions. Responsive to the data and the auxiliary information, a metric is derived to describe the operators. In yet another embodiment, the ORSU 135 facilitates simulated remote support sessions that are fulfilled by a plurality of operators in a virtual environment. Responsive to the data acquired during the simulated sessions, a metric is derived to describe the operators.

In an embodiment, the ORSU 135 may use the available metrics to compute an expected reliability score for a combination of an active remote support request and a remote operator. The ORSU 135 may compute such a reliability score for combinations of the remote support request with a plurality of remote operators, and assign the remote operator possessing the optimal reliability score to fulfill the requested remote support session.

In a further embodiment, the ORSU 135 facilitates selection of an operator via a remote operator marketplace. Responsive to a remote support request, the ORSU 135 may return a database of remote operator identifiers, their respective reliability scores and service fees applicable to the request such that a vehicle controller may subsequently select a desired operator to service the remote support request based on an arbitrary cost/benefit estimation.

In a further embodiment, an ORSU 135 may obtain metadata associated with a remote support request submitted by a vehicle controller such as estimated session duration, vehicle location, weather conditions and announced fees. The ORSU 135 may facilitate the selection of a remote operator to service the request.

An example embodiment of an ORSU 135 is described in further detail below with respect to FIG. 2.

The plurality of networks 140 represents the communication pathways between the vehicles 102, the remote support terminals 110, and the remote support server 120. In one embodiment, the networks 140 use standard communications technologies and/or protocols and can include the Internet. In another embodiment, the entities on the networks 140 can use custom and/or dedicated data communications technologies. The plurality of networks 140 may comprise networks of different types such as, for example, a public cellular connection, a dedicated or private wireless network, a low-latency satellite uplink, VANET wireless channels (including vehicle-to-vehicle or vehicle-to-infrastructure links), or any combination thereof. Furthermore, the plurality of networks 140 may include multiple networks of the same type operated by different service providers. The network devices 145 may include cell towers, routers, switches, LEO satellite uplink devices, WiFi hotspot devices, VANET devices, or other components that provide network services to the entities connected to the plurality of networks 140. The network devices 145 may be integrated into roadside infrastructure units that are integrated with traffic devices or other roadside systems. The network devices 145 may have varying capabilities and may be spread over a wide geographic area. Thus, different allocations of network resources may be available to vehicles 102 in different locations at different times depending on environmental factors, the capabilities of different network devices 145, and network congestion in the area where each vehicle 102 is located.

Figure 2:
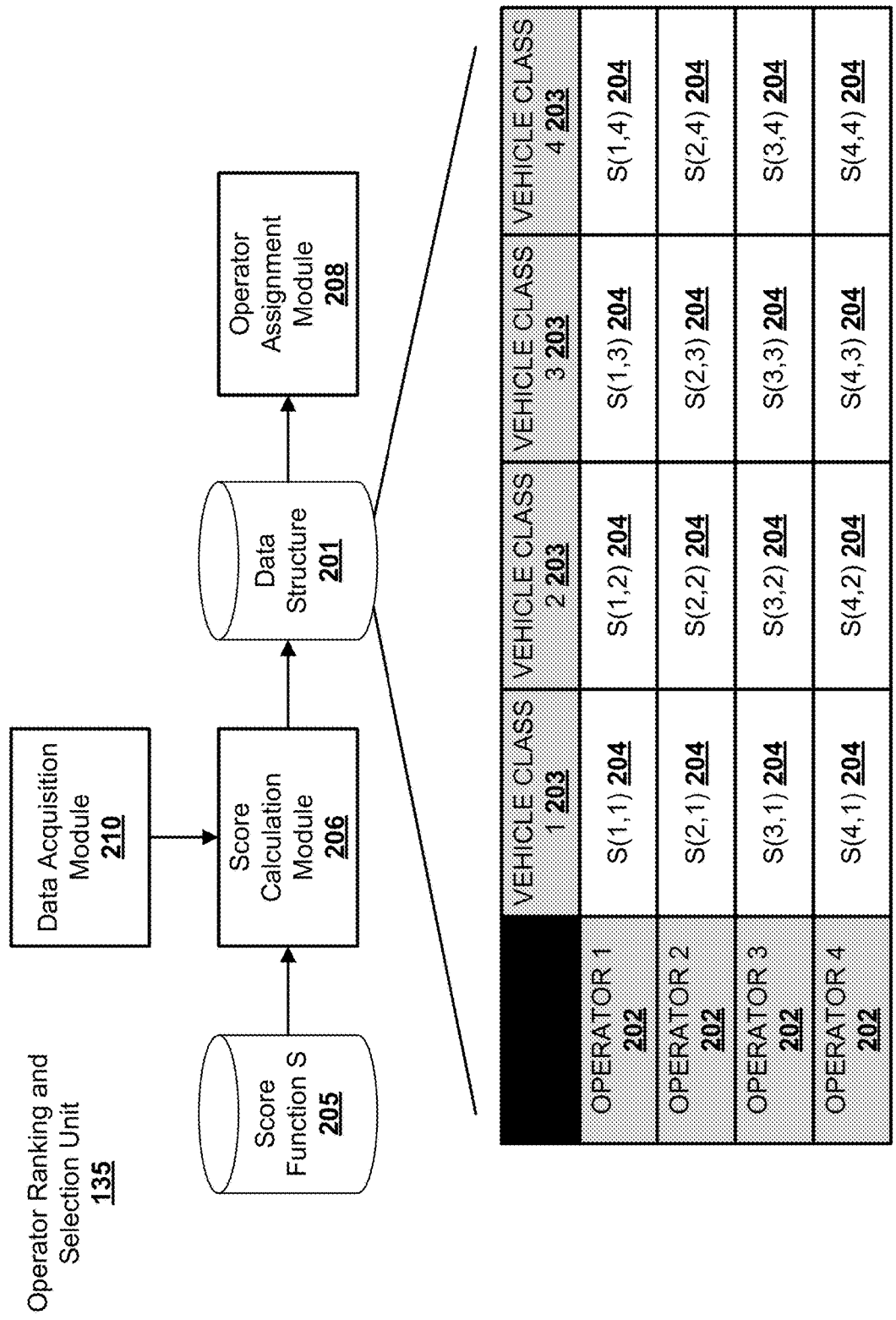
FIG. 2 illustrates an example embodiment of an operator ranking and selection unit.

FIG. 2 is an example embodiment of an ORSU 135. The ORSU 135 comprises a score function S 205, a score calculation module 206, a data acquisition module 210, a data structure 201, and an operator assignment module 208. Alternative embodiments may include different or additional modules.

The data structure 201 describes a vehicle-to-operator mapping that may be represented as a two-dimensional matrix, where each row corresponds to an operator 202, each column corresponds to a vehicle class 203, and each cell contains a value 204 of a score function S 205 determined by a score calculation module 206, and representing a projection of the safety level of a specific pair of an operator 202 and a vehicle class 203. The score function S 205 may comprise a multivariate function, with a higher score implying a better safety projection. The exact expression for the function may be influenced by business requirements, properties of the pool of available operators 202 or other considerations. The score calculation module 206 applies the score function S 205 to a set of data obtained by the data acquisition module 210 to generate the scores and stores the scores to the data structure 201. The score calculation module 206 may compute the scores for each pair of operator 202 and vehicle class 203 individually as operators 202 may possess varying expertise levels with different vehicle classes 203 depending on factors such as steering responsiveness, maximum engine power, dimensions, mass, or wheel base length of a vehicle 102. Score values 204 recorded in cells may be updated over time as specified below. Responsive to receiving a remote support request from a vehicle 102 belonging to a vehicle class 203, the operator assignment module 208 may select an operator 202 to fulfill the request by applying desired filtering and ordering functions to the data structure 201.

In an embodiment, the score function S 205 may be computed and stored separately for values or value ranges of certain dynamic variables, thus forming a plurality of M-dimensional subcells in each cell of the data structure 201 illustrated in FIG. 2, where M is the number of introduced dynamic variables. Such an approach may allow to reduce the variance of characteristics inside each subcell and extract information on global trends and differences between subcells.

In an embodiment, the score function S 205 may comprise a weighted linear sum of multiple terms, each determined by a specific operator characteristic: $S=\Sigma_i w_i s_i$.

In an embodiment, the score function S 205 may comprise a product of multiple safety factors $S=\Pi_i w_i s_i$ or risk factors $S=\Pi_i (1-w_i s_i)$. More generally, the score function S 205 may comprise a weighted sum of combinatorial dot products $S=\Sigma k=_{k_{min}}^{k_{max}} \Sigma C(\dot{S}, k) \cdot \neg C(\dot{S}, k)$, where elements of $C(\dot{S}, k)=\{s_{i1} \ldots s_{ik}, \ldots\}$ are complementary to the corresponding elements of $\neg C(\dot{S}, k) = \{(1-s_{j1}) \ldots (1-s_{jk}) \ldots, \ldots\}$ respective to the set of operator characteristics S.

In an embodiment, the score calculation module 206 may compute a characteristic $s_i \in \dot{S}$ over a time interval T of a desired duration, over a desired number of remote operation sessions fulfilled, or over a desired mileage covered by an operator 202 based on data from the data acquisition module 210.

In an embodiment, the score calculation module 206 may compute a characteristic $s_i \in \dot{S}$ over multiple time intervals $T_j$ of different durations, and redefine it as a weighted sum of computation results: $s_i = \Sigma_j w_j \cdot s_{ij}(T_j)$. Such an arrangement may be used to track variations in performance of an operator 202 and prioritize average performance over recent performance, or vice versa.

In an embodiment, the score function S 205 may in part comprise a function for normalization into a desired range such as $[-1; 1]$ or $[0; 1]$ using a linear transformation, logistical transformation, or other kind of transformation.

In an embodiment, the score function S 205 may in part comprise a function depending on a weighted sum of the minimum and average values of the temporal safety margin $t_s$ observed by an operator 202 over a desired time period: $S = F(w_1 \min t_s + w_2 < t_s >)$. Temporal safety margin $t_s$ may be defined as the time necessary to cover the distance D to the closest obstacle intercepting the trajectory of the vehicle 102 under the assumption that the kinematic state of the vehicle 102 remains unperturbed by subsequent control inputs. In a further embodiment, the temporal safety margin may be redefined to account for the operator 202 reaction time $t_r: t_s = t_s - t_r$. Such a transformation may allow to normalize the desired temporal safety margins over operators 202 possessing varying reaction times.

In an embodiment, the score function S 205 may in part comprise a function depending on a vehicle speed optimality parameter:

$$c_v = 1 - \left(\frac{v_{max} - v}{v_{max}}\right)$$

over time segments satisfying to predetermined conditions. For instance, such conditions may involve checks for traffic congestion levels, the level of road wetness and other factors affecting the tire-pavement rolling resistance, traversing of pedestrian zones and school vicinities, and proximity to route checkpoints. Such a parameter may reflect the fact that the operator 202 is expected to maintain the speed of a vehicle 102 as close to the allowed maximum in the current road segment as possible. In a further embodiment, the vehicle speed optimality parameter $c_v$ may account for issues such as sun glare on camera lenses that do not correspond to physical obstacles or legal restrictions but nevertheless may impair performance of an operator 202 and hence the maximum allowed speed.

In an embodiment, the score function S 205 may in part comprise a function depending on a vehicle acceleration optimality parameter $c_a$. An operator 202 may accelerate and decelerate a vehicle 102 to maintain the vehicle speed optimality parameter $c_v$ above a desired threshold in varying conditions during multiple time intervals while also limiting acceleration and braking by threshold values of $a_+ = \dot{v}_{max}|_{\dot{v}>0}$ and $a_- = \dot{v}_{max}|_{\dot{v}>0}$. For example, a vehicle acceleration optimality parameter $c_a = -\Sigma_i \Delta t_i [(\dot{v}_i - a_+)^2|_{\dot{v}_i > a_+} + (\dot{v}_i - a_-)^2|_{\dot{v}_i < a_-}]$ may be used as a penalty against aggressive acceleration and deceleration exceeding thresholds.

In an embodiment, the score function S 205 may in part comprise a function depending on the mean squared error between the steering angle derivative distribution function $p(\dot{\theta})$ and the functional $F(\dot{\theta})$ describing the desired profile:

$$M = \frac{1}{n}\sum_{i=1}^{n} \left(p(\dot{\theta}_i) - F(\dot{\theta}_i)\right)^2$$

where n is the number of discrete bins comprising the distribution function. Such a characteristic may allow the system to account for steering aggressiveness, while allowing a certain degree of freedom in customizing the expected driving style.

In an embodiment, the score function S 205 may in part comprise a function depending on the mean squared error between the braking deceleration distribution function $p(\dot{v})|_{\dot{v}<0}$ and the functional $F(\dot{v})|_{\dot{v}<0}$ describing the desired profile:

$$M = \frac{1}{n}\sum_{i=1}^{n}(p(\dot{v})|_{\dot{v}<0} - F(\dot{v})|_{\dot{v}<0})^2.$$

In an embodiment, the score function S 205 may in part comprise a function depending on the mean squared error between the acceleration distribution function $p(\dot{v})|_{\dot{v}>0}$ and the functional $F(\dot{v})|_{\dot{v}>0}$ describing the desired profile:

$$M = \frac{1}{n}\sum_{i=1}^{n}(p(\dot{v})|_{\dot{v}>0} - F(\dot{v})|_{\dot{v}>0})^2.$$

In an embodiment, the score function S 205 may in part comprise a function depending on total operator 202 driving mileage and mean mileage between incidents. For example, such a function may be expressed as $$E = \frac{\ln(M+1)}{N_a + 1},$$

where M is the total mileage experience of an operator 202, and Na is the number of incidents caused by an operator 202.

In a further embodiment, the score function S205 may in part comprise a function depending on any combination of directly measurable characteristics such as steering wheel reversal rate, gas and brake pedal pressure rate or fluctuation spectrum, voice communication duration per session, as well as derived characteristics such as perception reaction time, problem resolution time, standard deviation of lane position, maximum deviation from lane center, mean standard deviation offset from leading vehicle, heading difference with the roadway.

In an embodiment, the score function S 205 may in part comprise a function depending on any combination of physiological characteristics such as heart beat rate, skin conductance, eye pupil dilation or constriction, and limb motion deviation from standard models.

In an embodiment, the score function S 205 may in part comprise a function depending on any combination of subjective characteristics reported by an operator 202, such as perceived safety or urgency, perceived controllability and self-capability, fatigue or motion sickness. Such characteristics may be reported by an operator 202 in online or offline mode.

In a further embodiment, the score function S 205 may in part comprise a function depending on manual feedback provided by a supervisor monitoring the remote support session with or without the knowledge by operator 202.

In a further embodiment, the score function S 205 may in part comprise a function depending on feedback provided by a customer such as a passenger or a consignee during the remote support session or upon its termination. A customer may use numerical scoring system, verbose description form, or other types of feedback.

In an embodiment, the score function S 205 may in part comprise a function depending on the local time variable LT or its sub-ranges corresponding to intervals such as morning, daytime, evening and nighttime, allowing to account for operator 202 performance variance depending on circadian cycle phase, under the assumption that the operator 202 is not subject to innate disorders or environmental factors disrupting the circadian cycle.

In an embodiment, the score function S 205 may in part comprise a function depending on the level of environmental luminosity L or its sub-ranges reflecting the effects of specific environmental luminosity levels on the hormonal levels and operator 202 ability.

In another embodiment, the pool of vehicles 102 admitted to the remote support service may joined into clusters based on vehicle properties such as handling similarity. For instance, one cluster may be comprised solely of sport cars, another one may be comprised of pickup trucks and minivans, and yet another one may be comprised of a specific brand and class of industrial machines.

In an embodiment, the score calculation module 206 may involve discrete filters for matching an operator 202 to a specific vehicle 102. In this embodiment, an operator 202 may be assigned a mask vector comprised of 0 and 1 values (e.g. $V_o$=[0,0,1,1,0,1]), and a vehicle 102 may be assigned a basis vector $V_i$=[0,0,0,0,1,0]. The final filtering coefficient is then multiplied by the dot product of the required mask and basis vector combination $V_i \cdot V_o$; thus, the filtering coefficient is non-zero only when the mask vector contains a 1 in the same position as the sole unit value in the basis vector.

In an embodiment, the score calculation module 206 may use the filtering process described above to filter operators 202 depending on possession of a license type required for a particular vehicle class 203 in the target jurisdiction.

In an embodiment, the score calculation module 206 may use the filtering process described above to filter operators 202 depending on their linguistic, ethnic or cultural compatibility with the occupant(s) of a vehicle 102. For instance, a remote support request may only be assigned to an operator 202 fluently speaking the language native to the occupants of a vehicle 102, or to an operator 202 belonging to the same age group, musical or sports subculture as the occupants of a vehicle 102, or to an operator 202 holding religious or political views and alignments not in conflict with those held by the occupants of a vehicle 102.

In an embodiment, the score calculation module 206 may use the filtering process described above to filter operators 202 depending on the difference between an operator time zone and a vehicle time zone. For instance, a remote support request may only be assigned to an operator 202 located in the same time zone as the vehicle 102.

In an embodiment, the score calculation module 206 may use the filtering process described above to filter operators 202 depending on the location of the operator 202 workstation. For instance, a remote support request may only be assigned to an operator 202 located in the same municipality as the vehicle 102 if required by local legislation.

A number of embodiments of data collection for score assignment may be envisaged. Such methods may be classified as offline (i.e. requiring an advance data acquisition) and online (i.e. capable of data acquisition during normal operator function).

Figure 3:
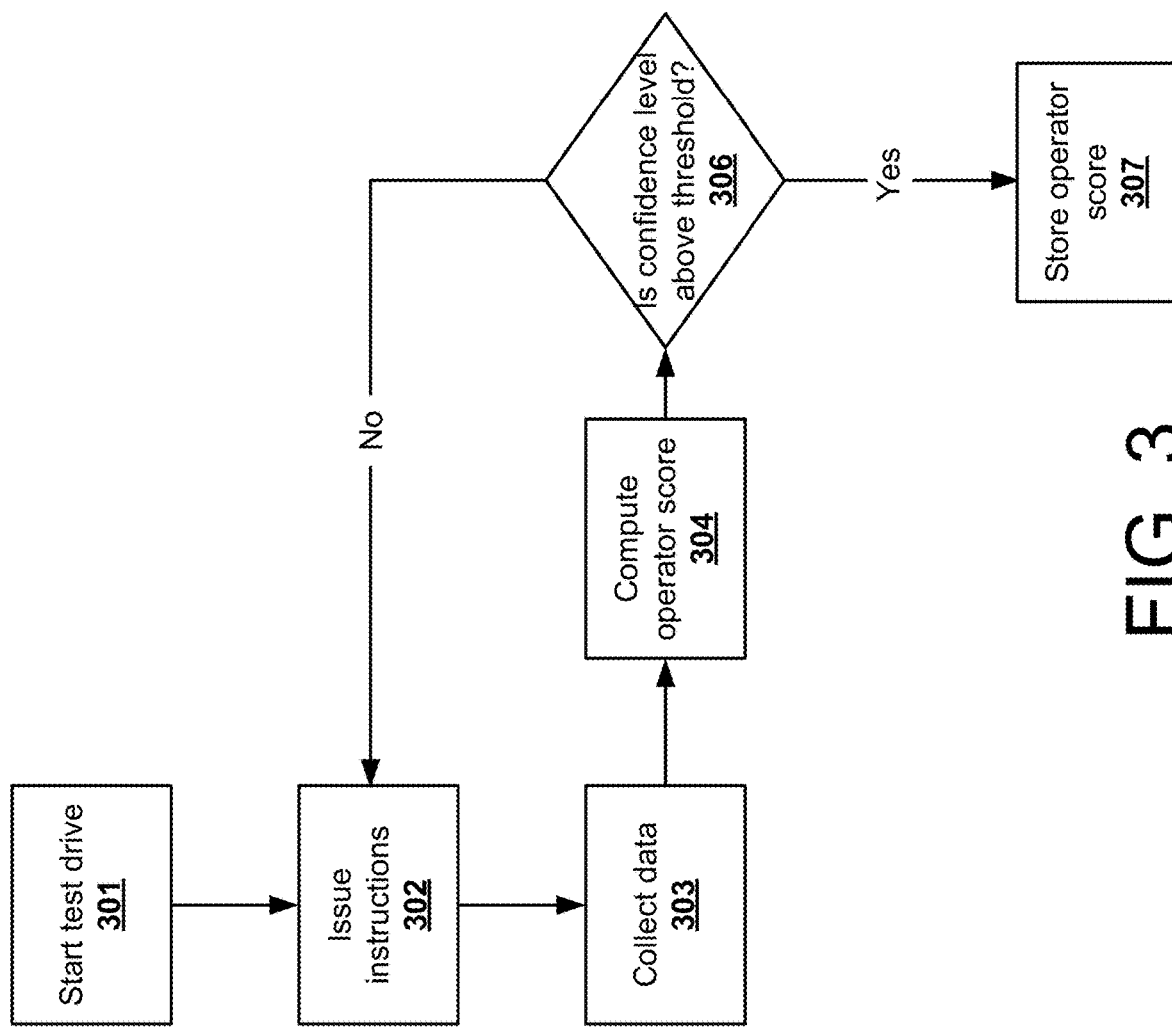
FIG. 3 illustrates an example embodiment of a process for operator evaluation using synthetic tests.

FIG. 3 is a flowchart illustrating an example embodiment of a process performed by the score calculation module 206 for performing a score calculation of a score representing suitability of an operator for operating a vehicle of a particular vehicle class. In this process the score calculation module 206 may evaluate an operator score value 204 using experimental tests involving a number of predefined maneuvers and tasks with the operator 202 remotely controlling a designated test vehicle 102 in a controlled environment such as dedicated testing grounds, or in an uncontrolled urban or rural environment. Particularly, a test drive is started 301 and the remote support terminal 110 may issue 302 instructions to the operator 202 to perform a specific maneuver or a navigation task. The score calculation module 206 may collect 303 data utilized for operator scoring. Subsequently, the score calculation module 206 computes 304 the operator score value 204 based on the collected data and determines a confidence level associated with the computed score. The confidence level may be based on, for example, the number of iterations that have been completed, a change in the operator score between iterations, an amount of data that has been processed, or other criteria. The confidence level is compared 306 to a predefined threshold. If the confidence level of the computed score exceeds a predefined threshold, the score calculation module 206 may store 307 the computed operator score value 204 to the data structure 201. Otherwise, the score calculation module 206 may issue 302 a new instruction to the operator 202 to perform the next maneuver in sequence. In subsequent iterations, the steps of collecting 303 data and computing 304 the operator score may be performed in a cumulative manner. For example, in one embodiment, the data collected 303 at each iteration is added to a cumulative set of data that includes data from prior iterations, and the operator score value 204 is computed 304 based on the cumulative data set. Alternatively, the data from prior iterations is not necessarily stored persistently, but the operator score value 204 is updated at each iteration such that the operator score is computed based on the most recently collected data and the previously computed operator score.

Figure 4:
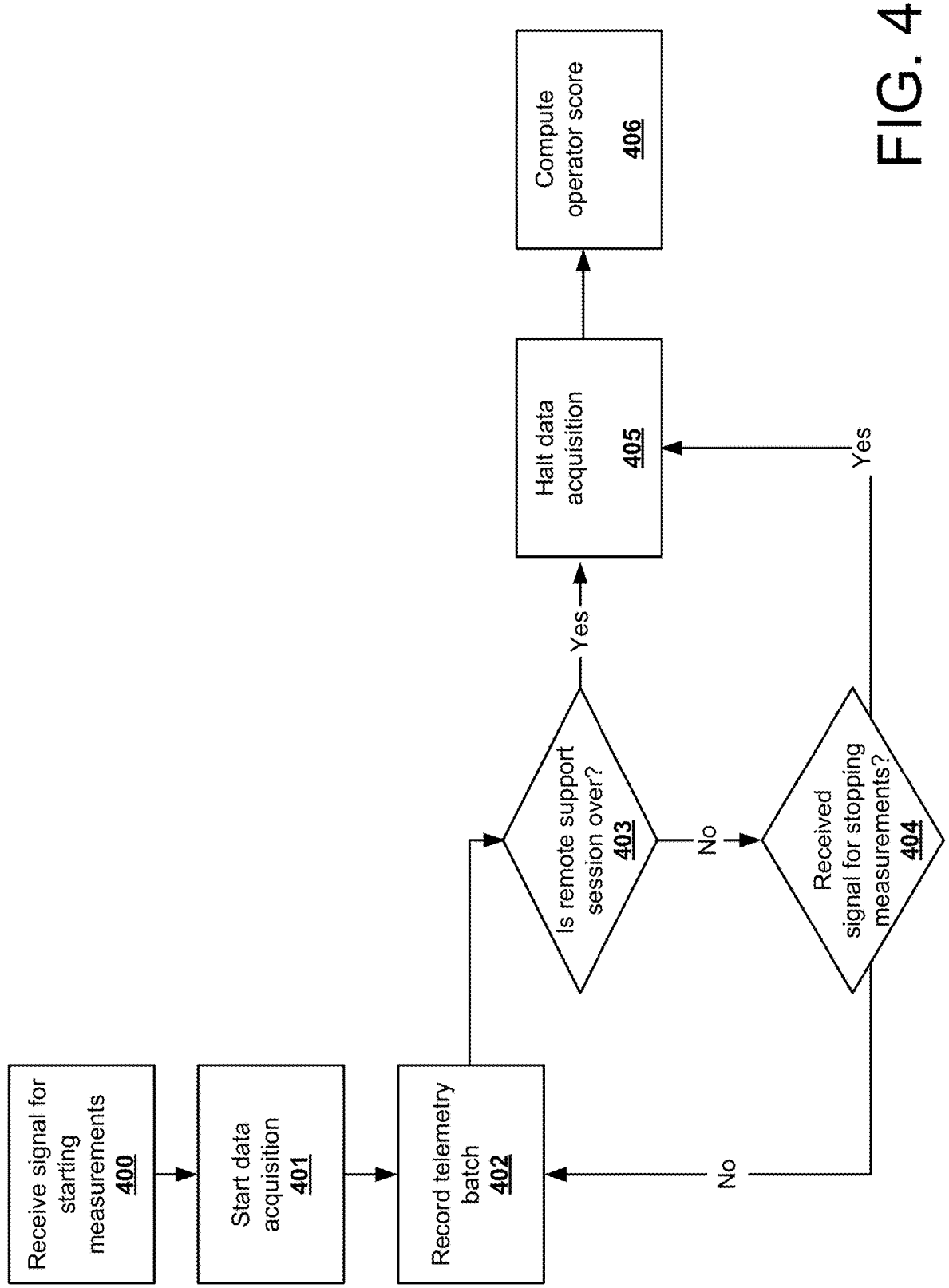
FIG. 4 illustrates an example embodiment of a process for operator evaluation using prior ride analysis.

The score calculation module 206 may furthermore perform real-time computations or updates to the operator score values 204 as operators fulfill remote support requests. FIG. 4 illustrates an example embodiment of a process for updating the operator score values 204 during the normal fulfillment of remote support requests by an operator 202. The score calculation module 206 receives 400 a signal for starting measurements of data utilized for computing an operator score value 204 during a remote support request. The score calculation module 206 starts 401 acquisition of data utilized for operator scoring (e.g., from the data acquisition module 210) and records 402 a telemetry batch of the collected data. Upon acquiring and recording a data batch the score calculation module 206 may determine 403 whether the remote support session has concluded. If the score calculation module 206 determines that the remote support sessions has not concluded, the score calculation module 206 determines whether a signal for stopping data acquisition has been received 404. If the signal for stopping measurements has not been received, the score calculation module 206 returns to step 402 to record an additional telemetry batch of data utilized for computation of the operator score value 204. Otherwise, responsive to either the remote support session ending 403 or the signal being received 404 for stopping the measurements, the score calculation module 206 may halt 405 the data acquisition process and compute 406 the operator score value 204. Here, the computation may involve computing the score based on a cumulative data set acquired during a prior time window or may involve updating a previously computed score based on the most recently acquired data.

In an embodiment, the score calculation module 206 may cause the remote support terminal 110 to occasionally display to the operator 202 distractions by adding an augmented reality (AR) signal to the video feed, and continuing to measure operator 202 response. For example, the remote support terminal 110 may display an AR speed hump and monitor the deceleration pattern employed by the operator 202. Such AR layers may also serve the purpose of keeping the operator 202 awake and aware; for example, responsive to the health monitoring system indicating that the operator 202 may have fallen asleep, the remote support server 120 may instruct the remote support terminal 110 to display an AR obstacle and measure the performance of the operator 202 in reacting to it.

Figure 5:
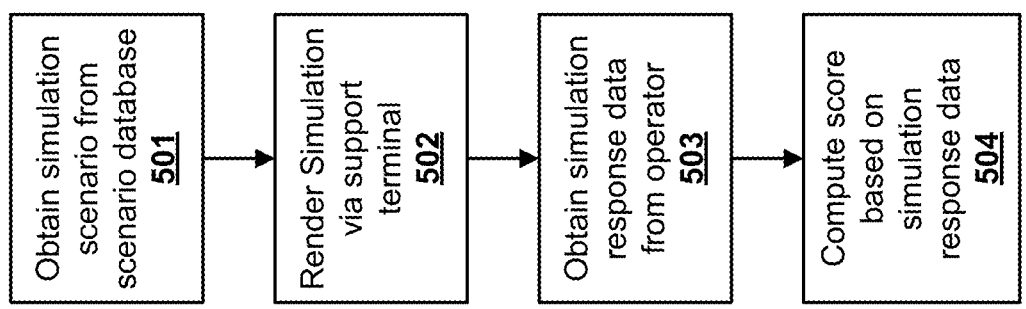
FIG. 5 illustrates an example embodiment of a process for operator evaluation using virtual environment ride analysis.

FIG. 5 illustrates an example embodiment of a process for computing operator scores based on performance data from a simulated support scenario. The score calculation module 206 obtains 501 a simulation scenario from a scenario database and renders 502 the simulation via a support terminal 110. The operator interacts with the simulated support scenario and the score calculation module 206 obtains 503 response data for evaluating the operator's performance. The operator score value 204 is then computed 504 based on the simulation response data. This approach may enable an operator 202 to be tested and profiled in a variety of situations that are difficult to safely replicate in a physical environment.

The operator assignment module 208 may employ a number of techniques for matching an operator 202 to a vehicle 102 that may be agnostic to the methodology used for profiling and scoring operators 202.

Figure 6:
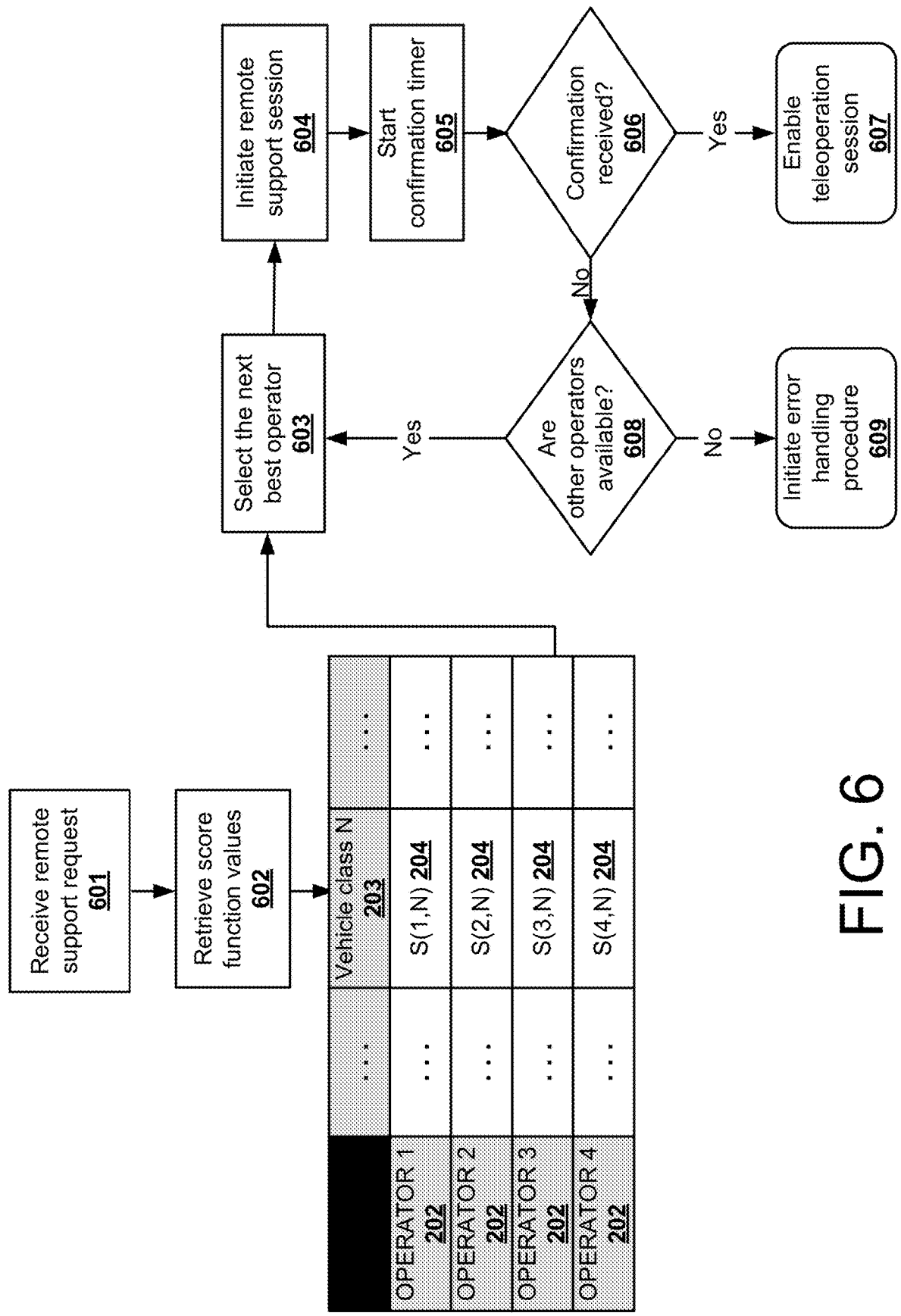
FIG. 6 is a block diagram illustrating a process for automatic selection of an optimal match between a vehicle and an available operator.

FIG. 6 illustrates a first embodiment of a process for assigning an operator to a remote support request. A remote support request is received 601 from a vehicle 102. Responsive to the request, the operator assignment module 208 may retrieve 602 the currently available operators 202 using their operator score values 204 as applied to the vehicle requesting remote support. The operator assignment module 208 may then sort the selected list of operators 202 and select 603 the operator 202 with the highest score value to fulfill the remote support request. The operator assignment module 208 then initiates 604 a remote support session and starts 605 a confirmation timer while awaiting operator confirmation or other positive action signal. Responsive to receiving 606 the confirmation signal, the operator assignment module 208 may enable 607 the teleoperator support module 130 to handle the remote support session for processing the request. Otherwise, if the timer expires before confirmation is received, the operator assignment module 208 may check 608 for existence of other operators suitable to fulfill the request, and select 603 a next available operator 202 in the sorted list. Otherwise, if no other operators are available, the operator assignment module 208 may initiate an error handling procedure 609.

In an embodiment, the operator assignment module 208 may use an estimate of a remote support session difficulty based on information such as road pattern in the proximity of the vehicle 102 or along its planned route, wireless network probing results, traffic congestion or other parameters to identify and filter the subset of operators 202 qualifying for fulfilling the remote support session. The operator assignment module 208 may then select an operator 202 with the lowest score value 204 still satisfying the requirements of the remote support session to maintain the availability of high-scoring operators 202 for a possible extraordinarily difficult remote support request.

In an embodiment, the operator assignment module 208 may use the concept of operator stack exploration in order to reduce the advantage possessed by the top performing operators 202 and to enable underperforming operators 202 to receive an increased share of remote support sessions. Responsive to a remote support request received from a vehicle 102, the operator assignment module 208 may retrieve the currently available operators 202 using their operator score values 204 as applied to the vehicle 102 requesting remote support. The operator assignment module 208 may then sort the selected list of operators 202 and select the operator 202 with the highest score value to fulfill the remote support request with a probability of 1−P, where P is the stack exploration probability. The remainder of the sorted and filtered list of operators 202 may be represented as an ordered list (i.e. $s_i > s_{i+n}(n \geq 0)$).

In a further embodiment, if the ordered list contains n elements, the remote support server 120 may define a range $$N' = \left[0; \frac{n^2 - n}{2}\right],$$

use a uniform random number generator to select a value n' in that range and to select the item with the highest $$i.s.t.n' > \frac{i^2 - i}{2}.$$

In a further embodiment, if the ordered list contains n elements, the remote support server 120 may define a range $$S' = \left[0; \frac{s_0^2 - s_0}{2}\right],$$

use a uniform random number generator to select a value n' in that range and to select the item with the highest $$s_i s.t.s' > \frac{s_i^2 - s_i}{2}.$$

In a further embodiment, the operator assignment module 208 may normalize the range $[s_0; s_n]$ to $[0; 1]$ and introduce an arbitrary monotonically decreasing probability density function $\Phi$ to determine the probability of a list item being selected.

In an embodiment, responsive to a persistently monitored operator score value 204 of an operator 202 or its gradient falling below a trigger threshold, the operator assignment module 208 may send a signal to the teleoperator support module 130 to enable the teleoperator support module to take an action such as engaging the vehicle's emergency stop function. Furthermore, the operator assignment module 208 may instruct another operator 202 via a remote support terminal 110 or other technical means to monitor the remote support session or to replace the operator 202 initially assigned to the remote support session, or take other actions.

In an embodiment, the operator assignment module 208 may assign an operator 202 to fulfill a remote support session designed to exhibit certain driving issues such a non-trivial intersection, heavy pedestrian traffic or occasional poor connectivity if the available data on operator 202 performance in specific scenarios is insufficient to confidently compute a score value 204.

Figure 7:
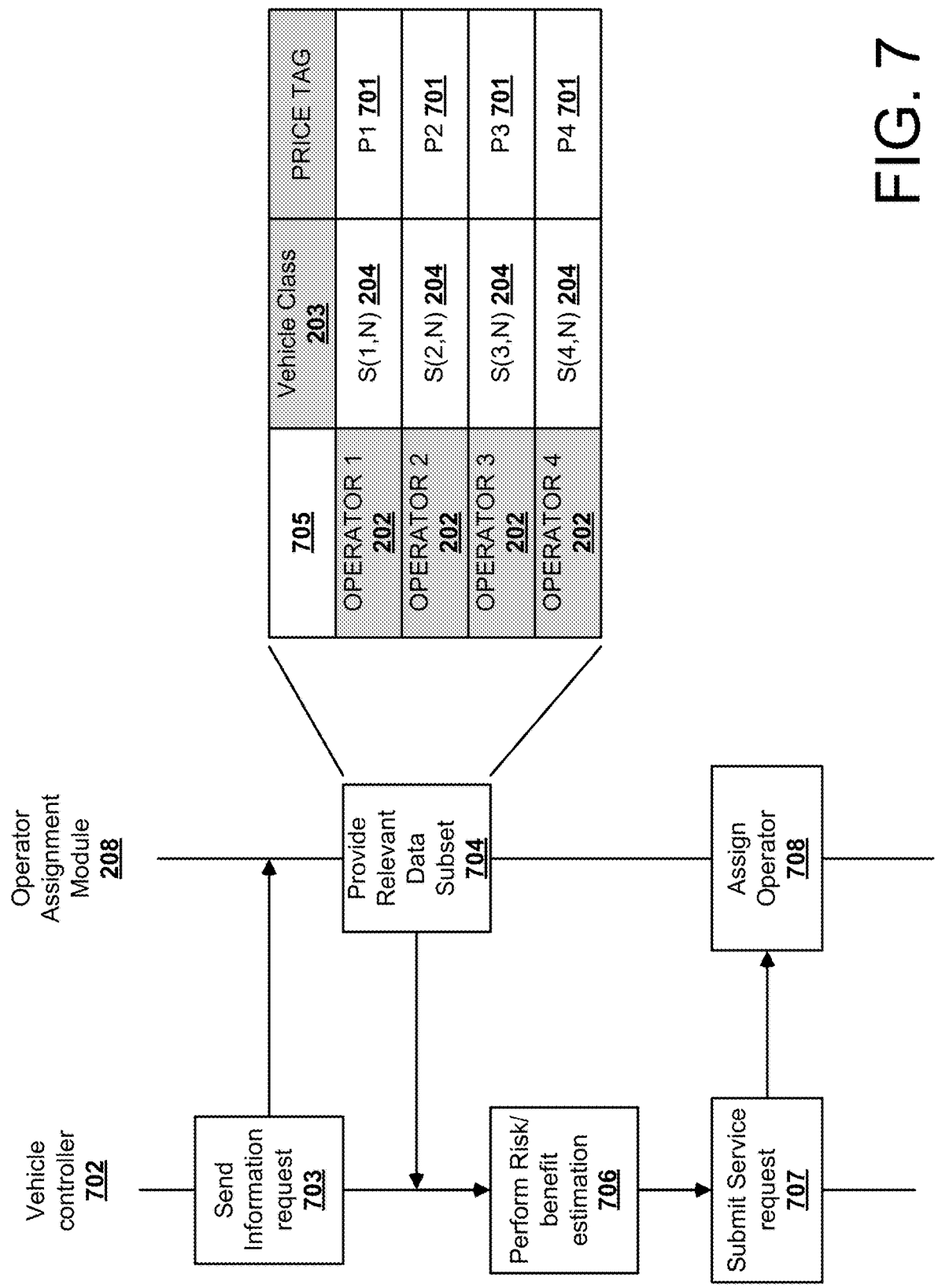
FIG. 7 is a block diagram illustrating a process for facilitating a remote support marketplace with remote operator agents as market makers.

FIG. 7 illustrates an embodiment of a process for matching an operator 202 to a vehicle 102 using a commodity exchange approach with operators 202 as market makers and vehicle controllers 702 as takers. Here, the vehicle controller 702 may comprise an on-board computer system within a vehicle 102 or a remote computer system for remotely managing a vehicle 102 (e.g., such as a fleet management system that manages a fleet of vehicles 102). The vehicle controller 702 may optionally be augmented by a human agent or plurality thereof. In this embodiment, the data structure 201 includes a "price tag" field in which each operator 202 may be manually or automatically assigned a price tag 701 that may be expressed as price per unit time, price per one take-over session, or otherwise. The vehicle controller 702 may first send 703 a preliminary information request to the operator assignment module 208, which receives the request. The operator assignment module 208 provides to the vehicle controller 702, a relevant subset 705 of the data structure 201 comprised in part of operator scores and price tags. The vehicle controller 702 receives the relevant subset 705 of the data structure 201 and may then perform 706 a risk and benefit estimation 706 to determine an operator that best meets the criteria of the vehicle controller 702. The vehicle controller 702 submits 707 a remote support request specifying the desired operator 202. The operator assignment module 208 assigns 708 the operator to the vehicle 102 based at least in part of the requested operator.

Figure 8:
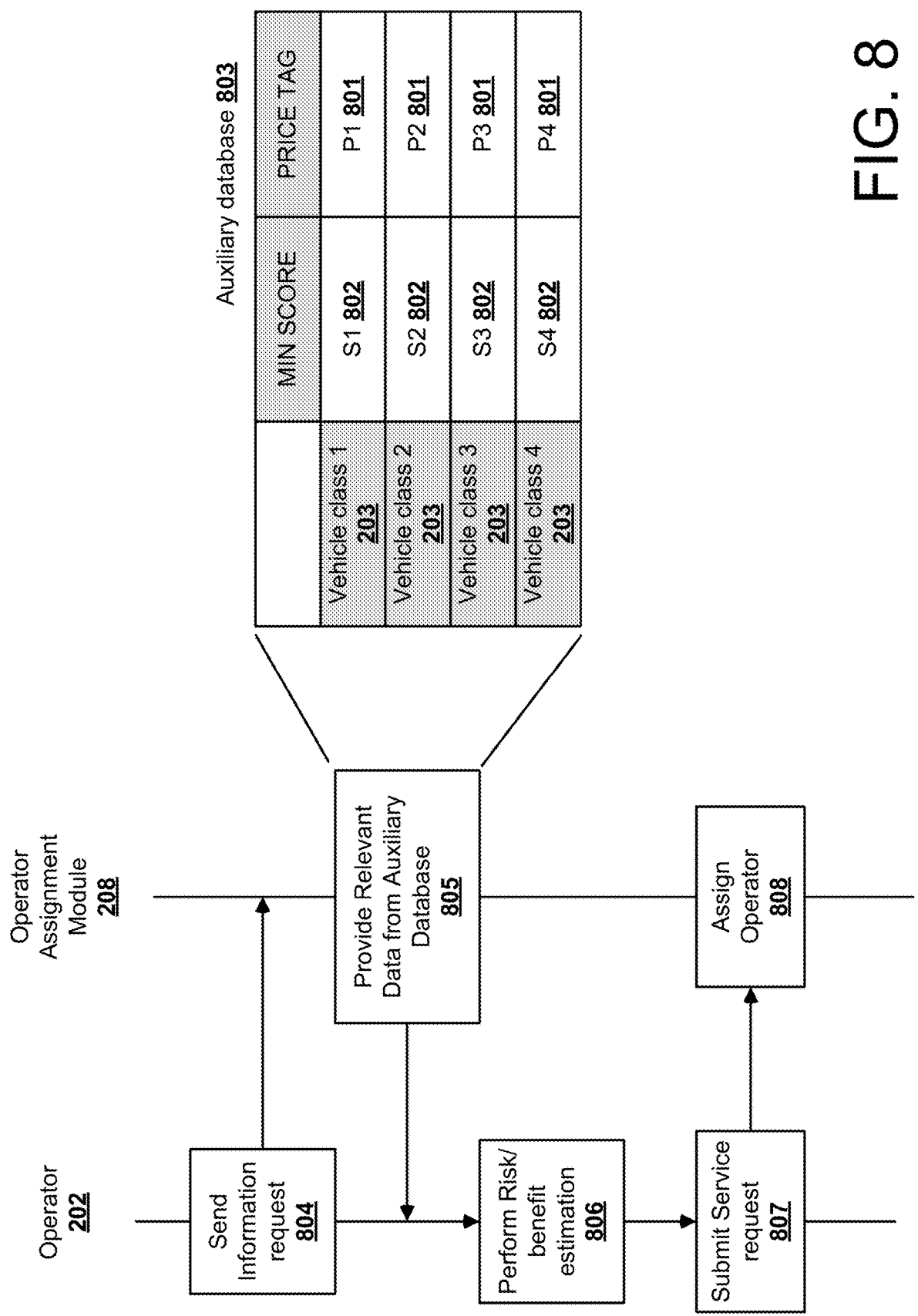
FIG. 8 is a block diagram illustrating a process for facilitating a remote support marketplace with vehicle controllers as market makers.

FIG. 8 illustrates an embodiment of a process for matching an operator 202 to a vehicle 102 using a commodity exchange approach with operators 202 as takers and vehicle controllers 702 as market makers. In this embodiment, the data structure 201 includes an auxiliary database 803 that stores, for each vehicle class 203, a price tag 801 and a minimum acceptable operator score value 802. An available operator 202 may send 804 an information request to the operator assignment module 208 to retrieve information from the auxiliary database 803 relevant to the operator 202 fulfilling a remote support request. The operator assignment module 208 receives the request and provides 805 the relevant data to the operator 202 (e.g., via a support terminal 110). The operator 202 can then perform 806 a risk/benefit estimation to select a vehicle class 203 or a specific service request meeting its desired criteria. The operator submits 807 a request to the operator assignment module 208 specifying a vehicle class 203 or specific service request that it desires to fulfill. The operator assignment module 208 assigns 808 the operator 202 to a support request based at least in part of the request from the operator 202.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, the use of the "a" or "an" are employed to describe elements and components of the embodiments herein. This is done merely for convenience and to give a general sense of embodiments. This description should be read to include one or at least one and the singular also includes the plural unless it is obvious that it is meant otherwise. The use of the term and/or is intended to mean any of: "both", "and", or "or."

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments.

The invention claimed is:

1. A method performed by a teleoperation server for selecting a teleoperator to remotely operate a vehicle over a network in response to a remote support request, the method comprising:
storing respective operator scores for a plurality of candidate operators to a teleoperator scoring database of a data storage system, each of the respective operator scores associated with a vehicle class, and each of the respective operator scores derived from performance data collected from a real or simulated test driving session for the vehicle class in which the plurality of candidate operators are requested to perform a specified set of driving maneuvers via controls of respective remote support terminals;
receiving over the network, the remote support request from the vehicle;
identifying, based on the remote support request, a vehicle class associated with the request;
performing a lookup in the teleoperator scoring database of the data storage system to determine, based on the vehicle class associated with the request, the respective operator scores for the plurality of candidate operators associated with the vehicle class;
matching the vehicle to a chosen operator from among the plurality of candidate operators based at least in part on the respective operator scores;
assigning the chosen operator to service the remote support request;
initiating, via a network connection of the network, a remote support session between a remote support terminal of the chosen operator and the vehicle; and
facilitating, via the network connection, teleoperation of the vehicle during the remote support session.

2. The method of claim 1, further comprising:
facilitating the one or more test driving sessions by issuing instructions for the plurality of candidate operators to perform teleoperation of a real test vehicle; and
generating the respective operator scores based on the performance data from the one or more test driving sessions.

3. The method of claim 1, further comprising:
facilitating the one or more test driving sessions by issuing instructions for the plurality of candidate operators to perform a simulated teleoperation of a simulated test vehicle; and
generating the respective operator scores based on the performance data from the one or more test driving sessions.

4. The method of claim 1, further comprising:
obtaining, during service of the remote support request, telemetry data pertaining the service of the remote support request; and
generating an updated operator score for the chosen operator based on the telemetry data.

5. The method of claim 1, wherein the chosen operator comprises a human teleoperator.

6. The method of claim 1, wherein the chosen operator comprises an artificial intelligence agent executing on a computing system.

7. The method of claim 1, wherein the performance data comprises at least one of: a speed optimality parameter, an acceleration optimality parameter, a steering angle performance parameter, a braking performance parameter, an experience parameter, a physiological parameter, a supervisor feedback parameter, a customer feedback parameter, and an environmental condition parameter.

8. A non-transitory computer-readable storage medium storing instructions for selecting by a teleoperation server, a teleoperator to remotely operate a vehicle over a network in response to a remote support request, the instructions when executed by one or more processors causing the one or more processors to perform a method comprising:
storing respective operator scores for a plurality of candidate operators to a teleoperator scoring database of a data storage system, each of the respective operator scores associated with a vehicle class, and each of the respective operator scores derived from performance data collected from a real or simulated test driving session for the vehicle class in which the plurality of candidate operators are requested to perform a specified set of driving maneuvers via controls of respective remote support terminals;

receiving over the network, the remote support request from the vehicle;

identifying, based on the remote support request, a vehicle class associated with the request;

performing a lookup in the teleoperator scoring database of the data storage system to determine, based on the vehicle class associated with the request, the respective operator scores for the plurality of candidate operators associated with the vehicle class;

matching the vehicle to a chosen operator from among the plurality of candidate operators based at least in part on the respective operator scores;

assigning the chosen operator to service the remote support request;

initiating, via a network connection of the network, a remote support session between a remote support terminal of the chosen operator and the vehicle; and facilitating, via the network connection, teleoperation of the vehicle during the remote support session.

9. The non-transitory computer-readable storage medium of claim 8, the instructions when executed further causing the one or more processors to perform steps comprising:

facilitating the one or more test driving sessions by issuing instructions for the plurality of candidate operators to perform teleoperation of a real test vehicle; and generating the respective operator scores based on the performance data from the one or more test driving sessions.

10. The non-transitory computer-readable storage medium of claim 8, further comprising:

facilitating the one or more test driving sessions by issuing instructions for the plurality of candidate operators to perform a simulated teleoperation of a simulated test vehicle; and generating the respective operator scores based on the performance data from the one or more test driving sessions.

11. The non-transitory computer-readable storage medium of claim 8, the instructions when executed further causing the one or more processors to perform steps comprising:

obtaining, during service of the remote support request, telemetry data pertaining the service of the remote support request; and generating an updated operator score for the chosen operator based on the telemetry data.

12. The non-transitory computer-readable storage medium of claim 8, wherein the chosen operator comprises a human teleoperator.

13. The non-transitory computer-readable storage medium of claim 8, wherein the chosen operator comprises an artificial intelligence agent executing on a computing system.

14. The non-transitory computer-readable storage medium of claim 8, wherein the performance data comprises at least one of: a speed optimality parameter, an acceleration optimality parameter, a steering angle performance parameter, a braking performance parameter, an experience parameter, a physiological parameter, a supervisor feedback parameter, a customer feedback parameter, and an environmental condition parameter.

15. A computer system comprising:

one or more processors; and a non-transitory computer-readable storage medium storing instructions for selecting a teleoperator to remotely operate a vehicle over a network in response to a remote support request, the instructions when executed by the one or more processors causing the one or more processors to:

store respective operator scores for a plurality of candidate operators to a teleoperator scoring database of a data storage system, each of the respective operator scores associated with a vehicle class, and each of the respective operator scores derived from performance data collected from a real or simulated test driving session for the vehicle class in which the plurality of candidate operators are requested to perform a specified set of driving maneuvers via controls of respective remote support terminals;

receive over the network, the remote support request from the vehicle;

based on the remote support request, a vehicle class associated with the request;

perform a lookup in the teleoperator scoring database of the data storage system to determine, based on the vehicle class associated with the request, the respective operator scores for the plurality of candidate operators associated with the vehicle class;

match the vehicle to a chosen operator from among the plurality of candidate operators based at least in part on the respective operator scores;

assign the chosen operator to service the remote support request;

initiate via a network connection of the network, a remote support session between a remote support terminal of the chosen operator and the vehicle; and facilitate via the network connection, teleoperation of the vehicle during the remote support session.

16. The computer system of claim 15, the instructions when executed further causing the one or more processors to:

facilitate the one or more test driving sessions by issuing instructions for the plurality of candidate operators to perform teleoperation of a real test vehicle; and generate the respective operator scores based on the performance data from the one or more test driving sessions.

17. The computer system of claim 15, the instructions when executed further causing the one or more processors to:

facilitate the one or more test driving sessions by issuing instructions for the plurality of candidate operators to perform a simulated teleoperation of a simulated test vehicle; and generate the respective operator scores based on the performance data from the one or more test driving sessions.

18. The computer system of claim 15, the instructions when executed further causing the one or more processors to:

obtain, during service of the remote support request, telemetry data pertaining the service of the remote support request; and generate an updated operator score for the chosen operator based on the telemetry data.

19. The computer system of claim 15, wherein the chosen operator comprises a human teleoperator.

20. The computer system of claim 15, wherein the chosen operator comprises an artificial intelligence agent executing on a computing system.

* * * * *